Dec. 30, 1930. T. ROWAN Re. 17,913

BUILDING CONSTRUCTION

Original Filed April 3, 1925

INVENTOR
Thomas Rowan
BY
ATTORNEY

Reissued Dec. 30, 1930

Re. 17,913

UNITED STATES PATENT OFFICE

THOMAS ROWAN, OF BROOKLYN, NEW YORK, ASSIGNOR TO STRUCTURAL GYPSUM CORPORATION, OF NEW YORK, N. Y., A CORPORATION OF DELAWARE

BUILDING CONSTRUCTION

Original No. 1,632,453, dated June 14, 1927, Serial No. 20,555, filed April 3, 1925. Application for reissue filed June 3, 1929. Serial No. 368,129.

This invention relates to a building construction and more particularly to a ceiling construction composed of pre-cast slabs of gypsum or like plastic material.

The invention has for an object to provide a novel and improved ceiling construction which is adapted to afford the floor frame superior protection from fire, which comprises a plurality of pre-cast slabs of plastic material suspended from the members of the floor frame in a novel manner to provide a substantially continuous body of the plastic material beneath the floor beams and at the same time to enable the slabs to be erected in a simple, economical and highly convenient manner, without requiring the use of scaffolding to form a substantially flat ceiling below the floor beams.

A further object of the invention is to provide a novel and improved ceiling construction comprising pre-cast slabs of plastic material, in which the individual slabs are suspended from and below the floor member in a novel and improved manner adapted to enable the slabs to be conveniently suspended at any desired distance and at a uniform distance below the floor beams, and at the same time to insure the production of a substantially flat ceiling.

To these ends the ceiling comprises a plurality of pre-cast slabs of plastic material which are in accordance with the present invention suspended from and below the floor beams by suspension members attached to the floor beam and which are arranged to cooperate with devices embedded in the slab and which project from the ends thereof. In the preferred form of the invention, longitudinal reinforcing members are embedded in the slabs and the ends of such members are preferably arranged to project through slots or recesses in the ends of the slabs and beyond the ends of the slabs, so that when the slabs are erected and in abutting relation to one another, the ends of the reinforcing members of one slab extend into the recesses in the end of the adjacent slab, and both slabs are preferably suspended from the floor beam by a suspension member attached to the floor beam and cooperating with the projecting ends of said reinforcing members between adjacent slabs.

These and other features of the invention will be hereinafter described and particularly pointed out in the claims at the end of this specification.

Figure 1:
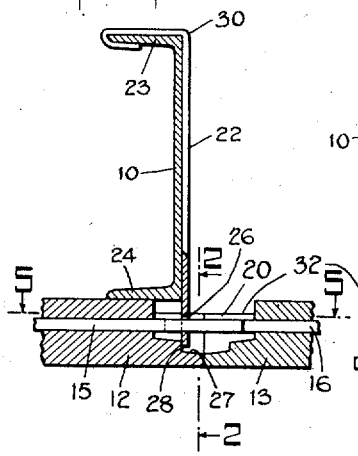
Figure 2:
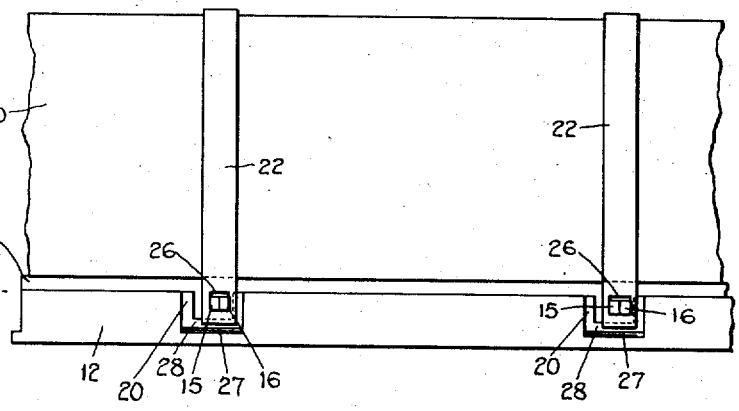
Figure 3:
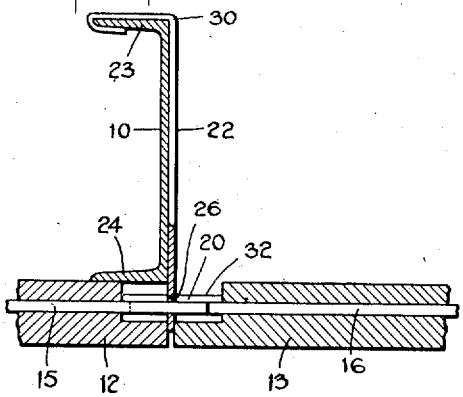
Figure 4:
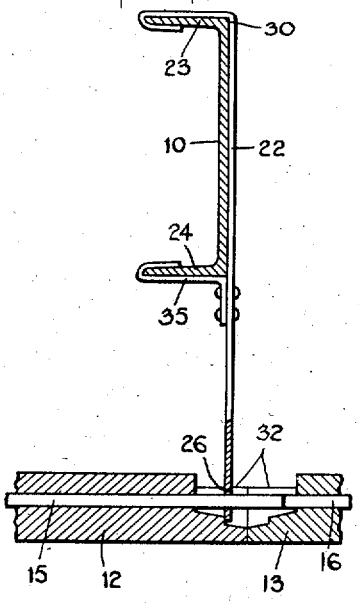
Figure 5:
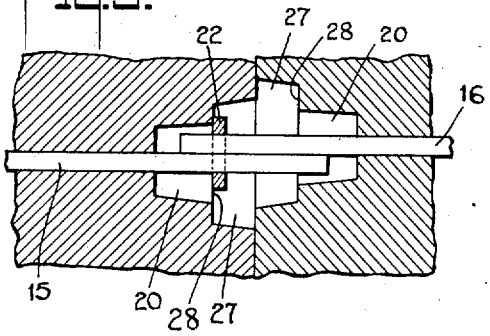

In the drawing illustrating the preferred form of the invention, Figure 1 is a sectional view illustrating one of the floor beams or members and the manner of suspension of abutting ceiling slabs from the floor beam; Fig. 2 is a sectional view taken on the line 2—2 of Fig. 1; Fig. 3 is a sectional view illustrating an alternate construction or method of suspension of the ceiling slabs; Fig. 4 is a sectional view illustrating the manner in which the ceiling slabs may be suspended at a distance below the floor beam; Fig. 5 is a sectional view on the line 5—5 of Fig. 1.

Referring to the drawing, 10 represents one of the floor beams of a floor frame which is herein shown as comprising a channel bar but which may comprise any of the usual forms of floor members or beams employed in building construction. 12, 13 represent portions of pre-cast ceiling slabs of gypsum or other plastic material which are preferably reinforced to impart additional strength thereto. As herein shown, the ceiling slabs 12, 13 are provided with longitudinal reinforcing members, one of which is shown in each slab as 15, 16. The ceiling slabs 12, 13 are suspended from the floor beams 10 with each slab spanning the space between two of the floor beams 10 and with adjacent slabs in abutting relation to form a substantially flat ceiling below the ceiling slabs, and in the preferred form of the invention the ends of the reinforcing members 15, 16 are arranged to project beyond the ends of the slab, and a suspension member 22, herein shown as a hanger, is attached to the floor beam 10 and arranged to engage and cooperate with the projecting end portions of the reinforcing members. The suspension member or hanger 22 preferably comprises a flat steel bar, the upper end of which is bent around the top flange 23 of the channel floor beam 10 to secure the hanger thereon. The hanger is arranged to extend directly down along the rear surface of the web of the channel 10 and to project slightly below the lower flange 24 of the channel. The lower end portion of the hanger 22 terminates between the slabs and is provided with an opening 26 of a size sufficient to permit the passage therethrough of the projecting ends of the reinforcing members 15, 16, which project from the ends of adjacent slabs. In order to accommodate these projecting end portions of the reinforcing members 15, 16 to permit the adjacent slabs to assume an abutting relation, the ends of the slabs 12, 13 are provided with notched out portions or open slots 20 therein. The slots 20 are preferably arranged with respect to the reinforcing members 15, 16, so that the projecting ends of the reinforcing members extend through the slots 20 to beyond the ends of the slabs, and the slots 20 are of such a width as to enable the projecting ends of the reinforcing members of one slab to extend into the corresponding slot in the end of the adjacent slab.

In practice, the slabs 12, 13 may be erected with the lower end of the hanger 22 extended downwardly into the space between the ends of the abutting slabs in the manner illustrated in Fig. 3, but it is preferred to form the openings or slots 20 sufficiently deep to accommodate the end of the hanger. In Fig. 1 I have illustrated the slot 20 as comprising an initial portion 27 of greater depth than the main body of the slot 20 and forming therewith a shoulder 28 against which the end of the hanger 22 may rest. With this construction, it will be observed that the lower end of the hanger 22 is protected against fire by a substantial body of the plastic material comprising the lower portion of the slab itself. It is also preferred to provide the ends of the slabs with a rabbet 32 which is adapted to permit grout or other plastic material to be poured under the lower flange 24 of the floor beam 10 after the slabs have been erected.

The suspension members or hangers 22 preferably comprise as above stated, flat steel bars, and in practice the hangers 22 may be formed with an initial right-angled bend at the corner 30 and shipped to the job in this form. The erector then applies the hanger to the floor beam 10, bending the upper end thereof around the top flange 23 of the floor beam. This may be readily and conveniently done by a hammer. With this construction of hanger it is possible to obtain a uniform spacing of the slabs 12, 13 below the floor beam inasmuch as the bend 30 may be of a definite distance from the lower end of the hanger, and the erector by placing the hangers over the top flange of the floor beam causes the slots 26 to assume a definite position with relation to the bottom of the floor beam, so that as the slabs are erected with the projecting ends of the reinforcing members inserted through the slots 26 in the hanger, the slabs are caused to be positioned at a uniform level and a flat ceiling at a substantially uniform level is insured. In practice it is sometimes desirable that the ceiling slabs 12, 13 be spaced some distance below the floor beams in order to permit the passage of conduits and wires between the ceiling and the floor beam, and for this purpose the hangers 22 may be made of a greater length than the hangers ordinarily employed and the ceiling slabs suspended in the manner described in connection with the construction illustrated in Figs. 1 and 3, using the elongated hanger. It is preferred to provide an additional strap 35 riveted or otherwise secured to the hanger which may be conveniently bent around the lower flange 24 of the floor beam in order to impart additional rigidity to the ceiling construction.

In order to erect the floor slabs it is necessary for the erector merely to position the hangers 22 over one of the floor beams and insert the ends of the reinforcing members projecting from one end of the ceiling slab through the slots 26 in the hangers. The second set of hangers are then slipped over the ends of the reinforcing members which project from the opposite end of the slab, and are then positioned upon the next floor beam and the upper end of the hanger hammered around the upper flange of the floor beam. In this manner the erector may erect the ceiling without requiring scaffolding, as all of the work may be done by the erector standing upon the top of the floor beams. After the slabs have been erected to form the ceiling, grout or other plastic material may be poured into the slots 20 and the rabbet 32, and when set the grout serves to anchor the hanger to the reinforcing members.

While the preferred embodiment of the invention has been illustrated and described, it may be embodied in other forms within the scope of the following claims.

Having thus described the invention, what is claimed is:

1. The combination with a floor beam of two pre-cast ceiling slabs of plastic material located below said floor beam in substantially abutting relation, and means for suspending said slabs from the floor beam comprising a device attached to and depending from the floor beam, and means embedded in and projecting from the adjacent ends of each slab and engaging said device.

2. The combination with a floor beam, of a pre-cast ceiling slab of plastic material provided with a slot in the end thereof, a device embedded in the slab and extended into said slot, and means attached to the floor beam and engaging said device within the slot for suspending the slab below the floor beam.

3. The combination with a floor beam of two pre-cast ceiling slabs of plastic material located below said floor beam and in substantially abutting relation, provided with longitudinal reinforcing members embedded therein and projecting from the adjacent ends of said slabs, and a member attached to the floor beam and engaging the projecting portions of the reinforcing members for suspending the slabs from the floor beam.

4. The combination with a floor beam of two pre-cast ceiling slabs of plastic material located below the floor beam and in substantially abutting relation, and each provided with longitudinal reinforcing members embedded therein and projecting from the adjacent ends thereof, openings in the ends of said ceiling slabs for receiving the projecting ends of the reinforcing members when the slabs are in abutting relation, and a member attached to the floor beam and cooperating with both reinforcing members for suspending the slabs from the floor beam.

5. The combination with a floor beam, of two pre-cast ceiling slabs of plastic material, provided at their adjacent ends with slots extending downward from the upper surface thereof and terminating above the bottom of the slab to provide a substantial body of plastic material below the bottom of the slots, devices embedded in the slabs and extended into said slots, and a hanger attached to the floor beam projecting into said slot and cooperating with the devices in said slot.

6. The combination with a floor frame having members spaced apart, of a ceiling extended under said members to fireproof the same and composed of pre-cast slabs of plastic material having reinforcing members, and hangers for said slabs engaged with said floor members and having their lower ends extended between adjacent slabs and engaged with the reinforcing members of both slabs below the upper surfaces of said slabs.

7. The combination with a floor frame having members spaced apart, of a ceiling extended under said members to fireproof the same and composed of pre-cast slabs of plastic material provided with longitudinal reinforcing members embedded therein and projecting from the ends thereof, and hangers on the floor members provided with openings into which the ends of the corresponding reinforcing members of abutting slabs project to suspend the slabs from the floor members.

8. In a building construction, in combination, a floor frame provided with a plurality of floor members spaced apart, and a continuous flat ceiling located below and suspended from said floor members and composed of a plurality of pre-cast slabs of plastic material of substantial thickness having reinforcing means embedded therein and arranged with each slab spanning the space between two of the floor members, and hanger members engaging the floor members and having their lower ends extended between abutting slabs and engaging the reinforcement of both slabs.

9. The combination with a floor beam, of two precast ceiling slabs of plastic material located below said floor beam in substantially abutting relation, and means for suspending said slabs from the floor beam passing over the top of, and depending from the floor beam, and a plurality of reinforcing means embedded in and projecting from each slab and engaging said suspending means.

10. The combination with a floor beam of two pre-cast ceiling slabs of plastic material, and means for suspending said slabs from the floor beam, passing over the top of and depending from the floor beam, and a plurality of reinforcing means embedded in and projecting from each slab and engaging said suspending means.

11. The combination with a floor beam, of a pre-cast ceiling slab of plastic material, a plurality of reinforcing devices embedded in the slab and having unembedded portions, means passing over the top of the floor beam and engaging the unembedded portions of the devices for suspending the slab from the floor beam.

12. The combination with a floor beam, of a pre-cast ceiling slab of plastic material provided with a slot, a device embedded in the slab and extended into said slot, and means engaging the floor beam and cooperating with said device within the slot, for suspending the slab from the floor beam.

13. The combination with a floor beam, of a pre-cast ceiling slab of plastic material provided with a slot at the end portion thereof, a device embedded in the slot extended into said slot, and means attached to the floor beam and engaging said device within the slot for suspending the slab below the floor beam.

14. The combination with a floor beam of a pre-cast ceiling slab of plastic material having spaced apart metallic reinforcements embedded therein, a portion of each reinforcement being exposed, and means passing over the top of the beam and engaging the exposed portion of each reinforcement for suspending the slab from the beam.

15. The combination with a floor beam, of two pre-cast ceiling slabs of plastic material, each provided with a slot extending downward from the upper surface thereof and terminating above the bottom of the slab to provide a substantial body of plastic material below the bottom of the slab, each slab having a device embedded therein and extended into its slot, and hanger means passing over the top of the floor beam and extending into a slot and cooperating with the device therein.

16. The combination with a floor beam, of a pre-cast ceiling slab of plastic material, provided with a slot extending downward from the upper surface thereof and terminating above the bottom of the slab to provide a substantial body of plastic material below the bottom of the slot, a device embedded in the slab and extended into said slot, and hanger means passing over the top of the beam and cooperating with the device in said slot.

17. A precast slab of plastic material having a reinforcement embedded within a slot extending downwardly from the slab top therein, a portion of the reinforcement being exposed, and a substantial body of the plastic material of the slab located below the exposed portion.

18. A precast slab of plastic material having a reinforcement embedded therein, said slab being provided with a slot in the end portion of the slab extending downwardly from the slab top and into which the reinforcement extends, the slot terminating short of the bottom of the slab.

19. A precast slab of plastic material having means embedded therein for attachment to a hanger said slab being provided with a slot extending downwardly from the slab top, said means extending into a slot, the slot terminating short of the bottom of the slab.

20. A precast slab of plastic material having means embedded therein for engagement with a hanger said slab being provided with a slot extending downwardly from the slab top, said means having a portion extending into said slot, the extended portion being below the top of the slab and the bottom of the slot terminating short of the bottom of the slab so as to provide a substantial body of hardened plastic material below that portion of the embedded means to be engaged by the hanger.

21. A precast slab of hardened plastic material having a hanger engaging means embedded therein said slab being provided with a slot extending downwardly from the slab top, a portion of the hanger engaging means being exposed within said slot, and a substantial body of the hardened material of the slab extending beneath the exposed portion of the hanger engaging means.

22. A building construction comprising a beam, a precast slab having a reinforcement embedded therein, a portion of which is exposed, and a hanger engaging the exposed portion of the reinforcement and the beam for suspending the slab from the beam a portion of said slab extending beneath said beam.

23. A building construction including a channel element, a precast slab having a reinforcement embedded therein, a portion of which is exposed, and a hanger engaging the exposed portion of the reinforcement and the channel element for suspending the slab from the channel element, a portion of said slab extending beneath said channel element.

24. A building construction including a ceiling supporting means, a precast slab having a reinforcement embedded therein, a portion of which is exposed and a hanger engaging the exposed portion of the reinforcement and the ceiling supporting means for suspending the slab from the ceiling supporting means, a portion of said slab extending beneath said ceiling supporting means.

In testimony whereof, I have hereunto subscribed my name this 28th day of May, 1929.

THOMAS ROWAN.